July 19, 1938.   J. J. BATTISTA ET AL   2,124,049
PLANT SUPPORT
Filed April 6, 1937

Joseph John Battista
James John Di Meglio
Inventors

By Clarence A. O'Brien
Hyman Berman
Attorneys

Patented July 19, 1938

2,124,049

UNITED STATES PATENT OFFICE 2,124,049

PLANT SUPPORT

Joseph John Battista and James John Di Meglio, South Norwalk, Conn.

Application April 6, 1937, Serial No. 135,341

1 Claim. (Cl. 47—47)

This invention appertains to new and useful improvements in means for supporting plants of various kinds.

The principal object of the present invention is to provide a form of hook for use with the usual plant bracing sticks which can be extended from the stick to engage the limbs of the plant and definitely hold the same in the correct position.

Other important objects and advantages of the invention will become apparent to the reader of the following specification.

In the drawing:—

Figures 1, 2:
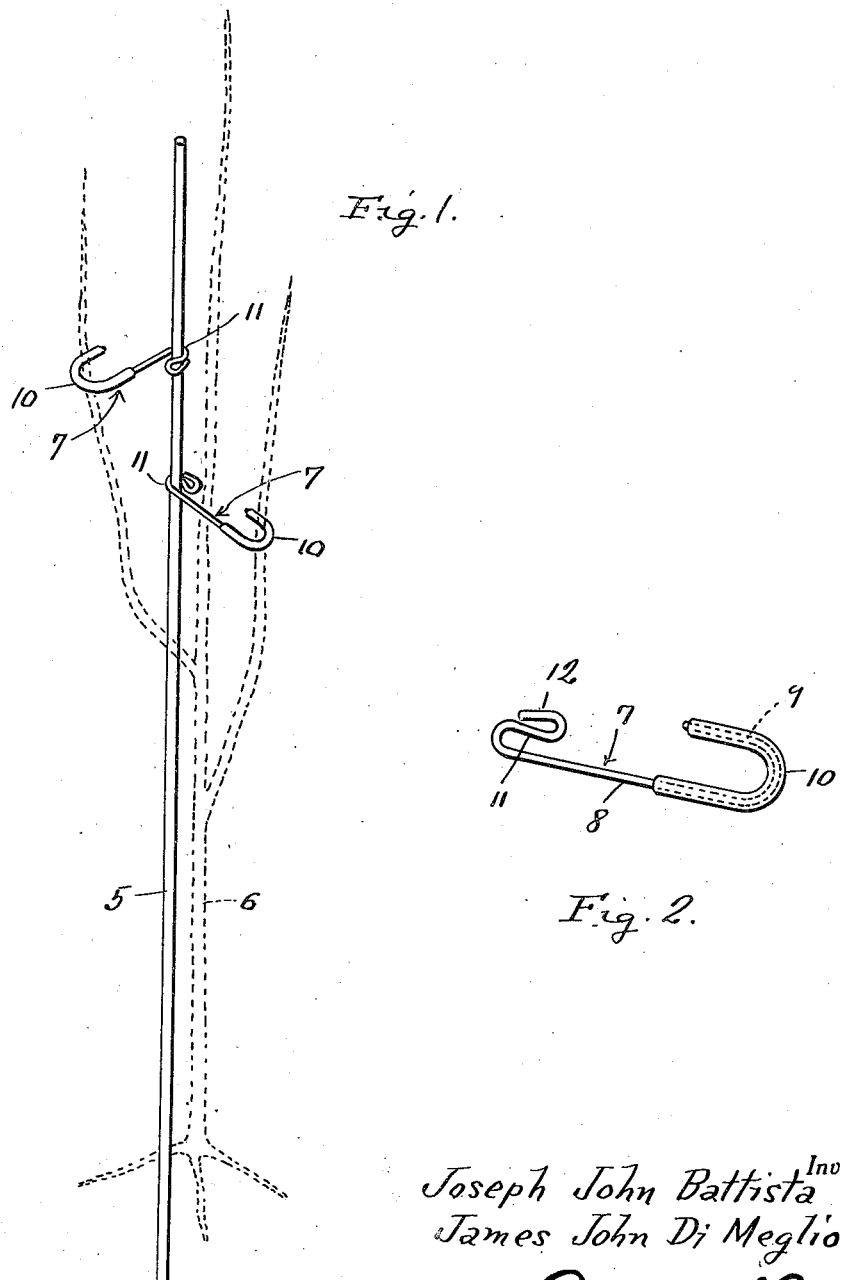
Figure 1 represents a side elevational view of a plant supporting stick with the hook members engaged thereon.
Figure 2 is a perspective view of one of the hook members.

Referring to the drawing wherein like numerals designate like parts, it can be seen that numeral 5 represents the usual plant supporting stick or rod which is driven into the ground at one end adjacent a plant 6.

Numeral 7 generally refers to the plant engaging hook; this hook consists of the elongated piece of spring wire 8 having one end bent to form the hook 9 which is preferably covered by the resilient sleeve 10 so as to not injure limbs against which the hook is disposed.

The opposite end of the wire member 8 is bent backwardly as at 11 and inwardly toward the intermediate portion of the wire member and then backwardly as at 12. This portion 11 defines a spring clasp which engages the stick 5 and holds the hook at a definite position on the stick.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

Means for supporting a portion of a plant from a stick comprising a member formed of a single piece of wire, one end of the wire being bent to provide a substantially U-shaped hook for engaging said part of the plant and the other end of the wire being bent to provide a small stick engaging hook, the beak of the small hook extending inwardly to provide a spring clamp, the end of the beak being bent outwardly and then inwardly to provide a loop having a rounded bight for facilitating engagement of the small hook with the stick.

JOSEPH JOHN BATTISTA.
JAMES JOHN DI MEGLIO.